US005561182A

United States Patent [19]
Baker et al.

[11] Patent Number: 5,561,182
[45] Date of Patent: Oct. 1, 1996

[54] HEAT STABILIZATION OF PVC COMPOSITIONS CONTAINING A MIXED METAL STABILIZER AND A $C_1$-$C_8$ DIALKYLTIN OXIDE

[75] Inventors: Paulette Baker, Chagrin Falls, Ohio; Richard F. Grossman, Wilmington, Del.

[73] Assignee: Synthetic Products Company, Cleveland, Ohio

[21] Appl. No.: 448,796

[22] Filed: May 24, 1995

Related U.S. Application Data

[63] Continuation-in-part of Ser. No. 252,074, Jun. 1, 1994, Pat. No. 4,117,195.
[51] Int. Cl.$^6$ .................................. C08K 3/24; C08K 5/04
[52] U.S. Cl. ........................... 524/394; 524/398; 524/425
[58] Field of Search .................................. 524/394, 398, 524/425

[56] References Cited

U.S. PATENT DOCUMENTS

| | | | |
|---|---|---|---|
| 2,680,726 | 6/1954 | Weinberg et al. | 524/289 |
| 3,816,307 | 6/1974 | Woods | 524/409 |
| 3,816,367 | 6/1974 | Larkin et al. | 524/410 |
| 4,085,088 | 4/1978 | Miyata et al. | 260/45.7 R |
| 4,156,679 | 5/1979 | Sudre | 524/409 |
| 4,221,687 | 9/1980 | Minagawa et al. | 252/400 |
| 4,299,759 | 11/1981 | Miyata et al. | 260/45.7 R |
| 4,675,356 | 6/1987 | Miyata | 524/424 |
| 4,711,920 | 12/1987 | Kugele et al. | 524/178 |
| 4,761,188 | 8/1988 | Miyata | 529/424 |
| 4,963,608 | 10/1990 | Kunieda et al. | 524/424 |
| 5,084,499 | 1/1992 | Todd et al. | 524/414 |
| 5,100,946 | 3/1992 | Hung et al. | 524/429 |
| 5,143,959 | 9/1992 | Carette et al. | 524/429 |
| 5,278,218 | 1/1994 | Carette et al. | 524/434 |
| 5,352,723 | 10/1994 | Tanno et al. | 524/399 |

OTHER PUBLICATIONS

Grossman, R. F., "Mixed Metal Vinyl Stabilizer Synergism. IV: Antimony Mercaptide/Group II Metal Carboxylate Blends," Antec '92, pp. 2288–2290.

*Primary Examiner*—Kriellion S. Morgan

[57] ABSTRACT

A method of stabilizing vinyl halide resin composition such as PVC by incorporating a mixed zinc/alkaline earth metal carboxylate stabilizer for said resin, a hydrotalcite and dibutyltin oxide in an amount to confer heat stability to said composition.

13 Claims, No Drawings

HEAT STABILIZATION OF PVC COMPOSITIONS CONTAINING A MIXED METAL STABILIZER AND A $C_1$-$C_8$ DIALKYLTIN OXIDE

RELATED APPLICATION

This application is a continuation-in-part application of U.S. application Ser. No. 08/252,074, filed Jun. 1, 1994, now Pat. No. 4,117,195, entitled HEAT STABILIZATION OF PVC COMPOSITIONS CONTAINING A MIXED METAL STABILIZER AND ANTIMONY TRIOXIDE in the name of Paulette Baker. The specification and claims of that entire application are incorporated herein by reference.

BACKGROUND OF THE INVENTION

It is well known that halogenated polymers such as PVC may be heat stabilized by combinations of divalent metal carboxylates, phenolic antioxidants, beta-diketones, phosphite salts, and hydrotalcite-like scavengers. U.S. Pat. No. 4,221,687 and 5,084,499 are examples of patents disclosing such stabilizers.

These types of stabilizer systems, where the metal carboxylates are based on zinc and alkaline earth metals, are useful in replacing stabilizers based on toxic metals such as cadmium or lead. In general, such calcium/zinc and barium/zinc stabilizers are not totally equivalent to lead or cadmium stabilizers in properties and processing. For example, heat stability is typically reduced with such zinc/barium or calcium stabilizers at elevated temperatures often encountered in processing vinyl halide resins at about 200° C.

Antimony carboxylates are too unstable to be used as heat stabilizers in PVC. Antimony mercaptides, such as antimony tris (isooctyl thioglycolate) are well known as PVC stabilizers with reference to U.S. Pat. No. 2,680,726. Recently, it has been suggested that antimony mercaptides do not typically function in PVC directly as stabilizers, but rather as phase transfer catalysts for efficient stabilization by metallic carboxylates, for example, calcium stearate, "MIXED METAL VINYL STABILIZER SYNERGISM. IV: ANTIMONY MERCAPTIDE/GROUP II METAL CARBOXYLATE BLENDS" by R. F. Grossman, Antec, pages 2228–2290 (1992). Antimony oxide has been used for many years in PVC for improving flame resistance, but has not been reported as conferring increased heat stability.

SUMMARY OF INVENTION

The present invention is directed to vinyl halide resin compositions containing a mixed metal stabilizer, a hydrotalcite and dialkyltin oxide in an amount to confer increased heat stability to such compositions.

As reported in the above copending application, it has been found that the addition of low levels of antimony trioxide to barium/zinc and calcium/zinc PVC heat stabilizers, which also contain a hydrotalcite, provides a very substantial and even synergistic increase in heat stability, comparable to the use of lead or cadmium. Accordingly, rather toxic lead or cadmium compounds may be eliminated according to the principles of this invention and heat stabilities in PVC may still be achieved. This increased level of heat stability also makes possible a much broader leeway in ratios of alkaline earth calcium or barium to zinc, and ratios of metals to other ingredients than was heretofore possible, thereby enabling compounding of PVC to a wider range of balance in properties.

It is also now reported herein that a dialkyltin oxide, such as dibutyltin oxide, may be substituted for antimony trioxide and the synergistic heat stabilizing effectiveness upon the PVC may still be achieved.

It has also been found that dibutyltin oxide provides little or no improvement in heat stability with metal stabilizers based, for example, on combinations of calcium/zinc or barium/zinc blends, beta-diketones, phosphite salts, and phenolic antioxidants, if a base such as hydrotalcite is not also included. These results and other results according to the principles of this invention are considered to be unexpected. The invention in these broader aspects, as well as other embodiments and parameters, may be further understood with reference to the following detailed descriptions.

DETAILED DESCRIPTION OF THE INVENTION

A. Vinyl Halide Resin

The vinyl halide resin employed is most commonly a homopolymer of vinyl chloride, i.e.,polyvinyl chloride. It is to be understood, however, that this invention is not limited to a particular vinyl halide resin such as polyvinyl chloride or its copolymers. Other halogen-containing resins which are employed and which illustrate the principles of this invention include chlorinated polyethylene, chlorosulfonated polyethylene, chlorinated polyvinyl chloride, and other vinyl halide resin types. Vinyl halide resin, as understood herein, and as appreciated in the art, is a common term and is adopted to define those resins or polymers usually derived by polymerization or copolymerization of vinyl monomers including vinyl chloride with or without other comonomers such as ethylene, propylene, vinyl acetate, vinyl ethers, vinylidene chloride, methacrylate, acrylates, styrene, etc. A simple case is the conversion of vinyl chloride $H_2C$—$CHCl$ to polyvinyl chloride ($CH_2CHCl$—)n wherein the halogen is bonded to the carbon atoms of the carbon chain of the polymer. Other examples of such vinyl halide resins would include vinylidene chloride polymers, vinyl chloride-vinyl ester copolymers, vinyl chloride-vinyl ether copolymers, vinyl chloride-vinylidene copolymers, vinyl chloride-propylene copolymers, chlorinated polyethylene, and the like. Of course, the vinyl halide commonly used in the industry is the chloride, although others such as bromide and fluoride may be used. Examples of the latter polymers include polyvinyl bromide, polyvinyl fluoride, and copolymers thereof.

B. Dialkyltin Oxide (Dibutyltin Oxide) Stabilizer System

Dibutyltin oxide, as indicated above, has been found to be synergistically operative in combination with a mixed metal stabilizer and a hydrotalcite. Dibutyltin oxide is believed to be an example of a dialkyltin oxide, more particularly, a $C_1$-$C_8$ dialkyltin oxide which will provide the stabilization results of the invention. Other examples may be dimethyltin and dioctyltin oxides. As explained above, mixed metallic carboxylates involving calcium/zinc or barium/zinc blends alone and in combination with other stabilizers such as beta-diketones, phosphite salts and phenolic antioxidants have been used. The metal stabilizer is a mixed metal salt of a carboxylate acid, advantageously of a $C_8$-$C_{24}$ carbon chain monocarboxylic acid such as lauric, oleic, stearic, octoic, or similar fatty acid salts. Mixed metal salts of such acids, and their preparation, are familiar to those skilled in the art to which this present invention pertains. However, it would not have been expected that antimony trioxide, a hydrotalcite and alkaline earth/zinc carboxylate blends would have provided enhanced heat stabilization in accordance with this invention. Hydrotalcites disclosed in U.S.

Pat. Nos. 4,085,088, 4,299,759 and 5,352,723 are suitable for use and their disclosures are incorporated herein by reference.

The following examples illustrate the practice of this invention, but these examples are not considered to be limiting upon the scope of this invention.

EXAMPLE 1

A composition was prepared on a 2-roll mill at 350° by blending PVC 100, diisodecyl phthalate 45, and tribasic lead sulfate 5.0. Compositions such as this are commonly employed in extruded wire coverings. In practice, such compositions would also include minor amounts of calcium carbonate or clay fillers to reduce cost and, in some cases, to improve processability. Pigments are, in practice, also included so as to distinguish one insulated conductor from another.

EXAMPLE 2

The composition of Example 1 was prepared except using 5 phr of dibasic lead phthalate in place of tribasic lead sulfate. Compositions such as this are also commonly employed in extruded wire coverings, typically with further minor addition of ingredients as noted in Example 1.

EXAMPLE 3

To composition of Example 1 was added 3.0 phr of antimony trioxide.

EXAMPLE 4

To the composition of Example 2 was added 3.0 phr of antimony trioxide. EXAMPLE 5

The following composition (phr) was prepared on a 2roll mill at 350° F.: PVC 100, diisodecyl phthalate (DIDP) 45, calcium terephthalate 0.75, a hydrotalcite of the approximate formula $Mg_{0.55} Zn_{0.15} Al_{0.3} OH(CO_3)_{0.15}$ sold as "Alcamizer 4", 1.2 dibenzoylmethane 0.06, calcium hydrogen phosphite 0.33, zinc laurate 0.21, barium laurate 0.39, and octadecyl 3—(3,5—di-t-butyl-4-hydroxphenyl) propionate phenolic antioxidant 0.06. Compositions such as this (with typical addition of low levels of filler and pigment, as noted above) have the potential to replace compositions such as that of Example 2, that is, they provide equivalent processability and, in most respects, equivalent properties. They have, in addition, the advantage of not containing an ingredient having chronic toxicity to workers or the environment, such as lead-based stabilizers.

EXAMPLE 6

The following composition (phr) was prepared on a 2-roll mill at 350° F.: PVC 100, DIDP 45, calcium carbonate 0.3, calcium terephthalate 0.45, hydrotalcite (as above) 0.36, Type 4A zeolite 0.84, dibenzoylmethane 0.06, bisphenol A 0.09, calcium hydrogen phosphite 0.3, zinc laurate 0.3, and calcium stearate 0.3 phr. Compositions such as this have the potential to replace compositions such as that of Example 1, providing equivalent processability and, for the most part, equivalent properties. Generally, compositions such as this have the potential to replace compositions such as that of Example 1, providing equivalent processability and, for the most part, equivalent properties. Examples 1 and 6 are used in applications having less demanding service conditions, in terms of resistance to dry heat and to hot water, than the compositions of Examples 2 and 5.

EXAMPLE 7

To the composition of Example 5 was added 3.0 phr of antimony oxide.

EXAMPLE 8

To the composition of Example 6 was added 3.0 phr of antimony oxide.

EXAMPLE 9

To the composition of Example 5 was added 1.0 phr of antimony oxide.

EXAMPLE 10

To the composition of Example 5 was added 0.75 phr of antimony oxide.

EXAMPLE 11

To the composition of Example 5 was added 0.5 phr of antimony oxide.

The compositions described above were subjected to accelerate heat aging at 410° F. in a circulating air oven per ASTM Standard D2115, an accepted test for thermal stability which measures discoloration. Noted is the time in minutes at 410° F. for the sample to develop slight discoloration (beige to yellow), moderate darkening (various shades of brown), and to become black and embrittled:

| Example | Slt Discolor | Mod. Discolor | Black (end point) |
|---------|--------------|---------------|-------------------|
| 1       | 5            | 25–30         | >60 min.          |
| 2       | 10           | 30–40         | >60               |
| 3       | 5            | 25–30         | >60               |
| 4       | 10           | 30–40         | >60               |
| 5       | 15           | 25            | 40                |
| 6       | 15           | 25            | 40                |
| 7       | 20           | 40–50         | >60               |
| 8       | 15           | 35–45         | >60               |
| 9       | 15           | 35–45         | >60               |
| 10      | 15           | 35–45         | >60               |
| 11      | 15           | 30            | 45                |

The comparison of the behavior of Examples 3 and 4 versus 1 and 2 indicates that addition of antimony oxide neither increases nor decreases the heat stability of PVC stabilized by the two most common lead-based stabilizers (tribasic lead sulfate and dibasic lead phthalate). Examples 5 and 6, the non-lead samples, show considerably less discoloration at the start of the aging test. This is very important in practice as it covers the length of time the composition is likely to see at elevated temperatures during processing. The middle part of the test cycle (the time to moderate discoloration) and the end point (the time to complete blackening and embrittlement) are, however, not as favorable as with the lead-based stabilizers. This is typical of what is found in practice. During actual processing, there is often the possibility of the composition sticking to sections of the process equipment (i.e., "hanging up", as it is called). Thus the long term protection afforded by the above lead stabilizers is also significant.

Examples 7 and 8 indicate that, in contrast to the behavior of lead-based systems, 3 phr of antimony oxide provides a major improvement in long term, high temperature heat stability, exceeding the results with the lead stabilizers at all points. Examples 9 and 10 indicate that this improvement persists at 1 phr and even at 0.75 phr antimony oxide. Example 11 shows that, although not equivalent to the others, some improvement is gained even at the 0.5 phr level. Further data indicates that only a very slight improvement is found at 0.25 phr, and that use of 5.0 phr provides no further improvement over 1–3 phr.

Examples 12 A–J
The following compositions were mixed and heat aged per ASTM D2115 as above:

|          | 12A | 12B | 12C | 12D | 12E | 12F | 12G | 12H | 12I | 12J |
|----------|-----|-----|-----|-----|-----|-----|-----|-----|-----|-----|
| PVC      | 100 | 100 | 100 | 100 | 100 | 100 | 100 | 100 | 100 | 100 |
| DIDP     | 45  | 45  | 45  | 45  | 45  | 45  | 45  | 45  | 45  | 45  |
| Ba laur. | 0.4 | 0.4 | 0.4 | 0.4 | 0.4 | 0.4 | 0.4 | 0.4 | 0.4 | 0.4 |
| Zn laur. | 0.2 | 0.2 | 0.2 | 0.2 | 0.2 | 0.2 | 0.2 | 0.2 | 0.2 | 0.2 |
| Antiox.  | 0.1 | 0.1 | 0.1 | 0.1 | 0.1 | 0.1 | 0.1 | 0.1 | 0.1 | 0.1 |
| Sb2O3    | —   | 1   | —   | 1   | —   | 1   | —   | 1   | —   | 1   |
| diketone | —   | —   | 0.1 | 0.1 | —   | —   | —   | —   | —   | —   |
| Ca ters  | —   | —   | —   | —   | 0.8 | 0.8 | —   | —   | —   | —   |
| Ca phos  | —   | —   | —   | —   | —   | —   | 0.3 | 0.3 | —   | —   |
| Hydrotalc| —   | —   | —   | —   | —   | —   | —   | —   | 1.2 | 1.2 |
| Black Pt.| 10  | 10  | 10  | 10  | 10  | 10  | 15  | 15  | 20  | 55  |

It can be seen from this series of experiments that antimony oxide is synergistic with the combination of mixed metal carboxylates, phenolic antioxidant and hydrotalcite, but not with the other ingredients (beta-diketone, calcium phosphite, calcium terephthalate) of Examples 5 and 6. Similar experiments established that the combination of calcium and zinc carboxylates plus hydrotalcite and antimony oxide provides synergistic improvement, and that inclusion of the phenolic antioxidant is not necessary for this effect to occur. The combination of hydrotalcite and antimony oxide without metal carboxylates is also ineffective.

EXAMPLES 13 A–J

It is now reported herein when Examples 12 A–J are repeated and a dialkyltin oxide such as dibutyltin oxide is substituted for antimony trioxide, synergism with the metal carboxylates and hydrotalcite is also demonstrated in a similar fashion.

EXAMPLES 14–17

When Examples 7 and 9–11 are repeated substituting dibutyltin oxide for antimony trioxide, a synergistic heat stabilizing effectiveness is also demonstrated by the relative amounts of the mixed zinc/alkaline earth metal carboxylate, hydrotalcite and dibutyltin oxide.

Having described this invention, its advantages and parameters, it would be obvious to persons of ordinary skill in the art, in view of the above description, that variations thereof may be made without departing from the spirit and scope thereof.

What is claimed is:

1. A vinyl halide resin composition consisting essentially of a vinyl halide resin, a mixed zinc/alkaline earth metal carboxylate stabilizer for said resin, a hydrotalcite and a $C_1$–$C_8$ dialkyltin oxide in relative amounts which together confer a synergistic heat stabilizing effectiveness upon said resin.

2. The composition of claim 1 wherein said vinyl halide resin is selected from the group of polyvinyl chloride, chlorinated polyethylene and chlorosulfonated polyethylene.

3. The composition of claim 1 wherein said mixed metal stabilizer is a mixed metal salt of a higher fatty acid selected from the group consisting of barium/zinc carboxylate, and calcium/zinc carboxylate and mixtures thereof, and said base is a hydrotalcite.

4. The composition of claim 1 wherein said mixed metal stabilizer is present in an amount from about 0.5 to about 5 parts and said dialkyltin oxide is present in an amount from about 0.2 to about 5 parts and said vinyl halide resin is present in an amount of about 100 parts.

5. The composition of claim 4 wherein said dialkyltin oxide is dibutyltin oxide.

6. The composition of claim 3 wherein the fatty acid is selected from the group consisting of stearic, oleic, octoic and lauric acids.

7. The composition of claim 1 wherein dibutyltin oxide is present in an amount of about 1 to about 3 parts per 100 parts of resin.

8. A method of improving the heat stability of vinyl halide resin compositions consisting essentially of providing a vinyl halide resin containing a mixed metal carboxylate stabilizer of an alkaline earth metal and zinc for said resin and a hydrotalcite, and adding a $C_1$–$C_8$ dialkyltin oxide in an effective amount which together with said stabilizer and hydrotalcite confers a synergistic heat stabilizing effectiveness of the mixed metal compound stabilizer upon said resin.

9. The method of claim 8 wherein said vinyl halide resin is selected from the group of polyvinyl chloride, chlorinated polyethylene and chlorosulfonated polyethylene.

10. The method of claim 8 wherein said mixed metal stabilizer is a mixed metal salt of a higher fatty acid selected from the group consisting of barium/zinc carboxylate, and calcium/zinc carboxylate and mixtures thereof.

11. The method of claim 8 wherein said mixed metal stabilizer is present in an amount from about 0.5 to about 5 parts and said dialkyltin oxide is dibutyltin oxide present in an amount from about 0.2 to about 5 parts and said vinyl halide resin is present in an amount of about 100 parts.

12. The method of claim 11 wherein the fatty acid is selected from the group consisting of stearic, oleic, octoic and lauric acids.

13. The method of claim 11 wherein dibutyltin oxide is present in an amount of about 1 to about 3 parts per 100 parts of resin.

* * * * *